United States Patent Office

3,559,030
Patented Jan. 26, 1971

3,559,030
PULSE WIDTH MODULATED SOLID STATE
REGULATED POWER SUPPLY
Donald C. Bussard, Cinnaminson, N.J., assignor to
RCA Corporation, a corporation of Delaware
Filed Nov. 27, 1968, Ser. No. 779,326
Int. Cl. H02p *13/18;* H03k *1/18;* H02m *3/22*
U.S. Cl. 321—2          5 Claims

ABSTRACT OF THE DISCLOSURE

A regulated power supply in which the pulse width of the current supplied to one or more output means is modulated in width in accordance with the desired output voltage. By providing one or more output means, and connecting them in series or parallel or series parallel, various loads may be supplied by fundamentally the same power supply.

BACKGROUND

Figure 1:
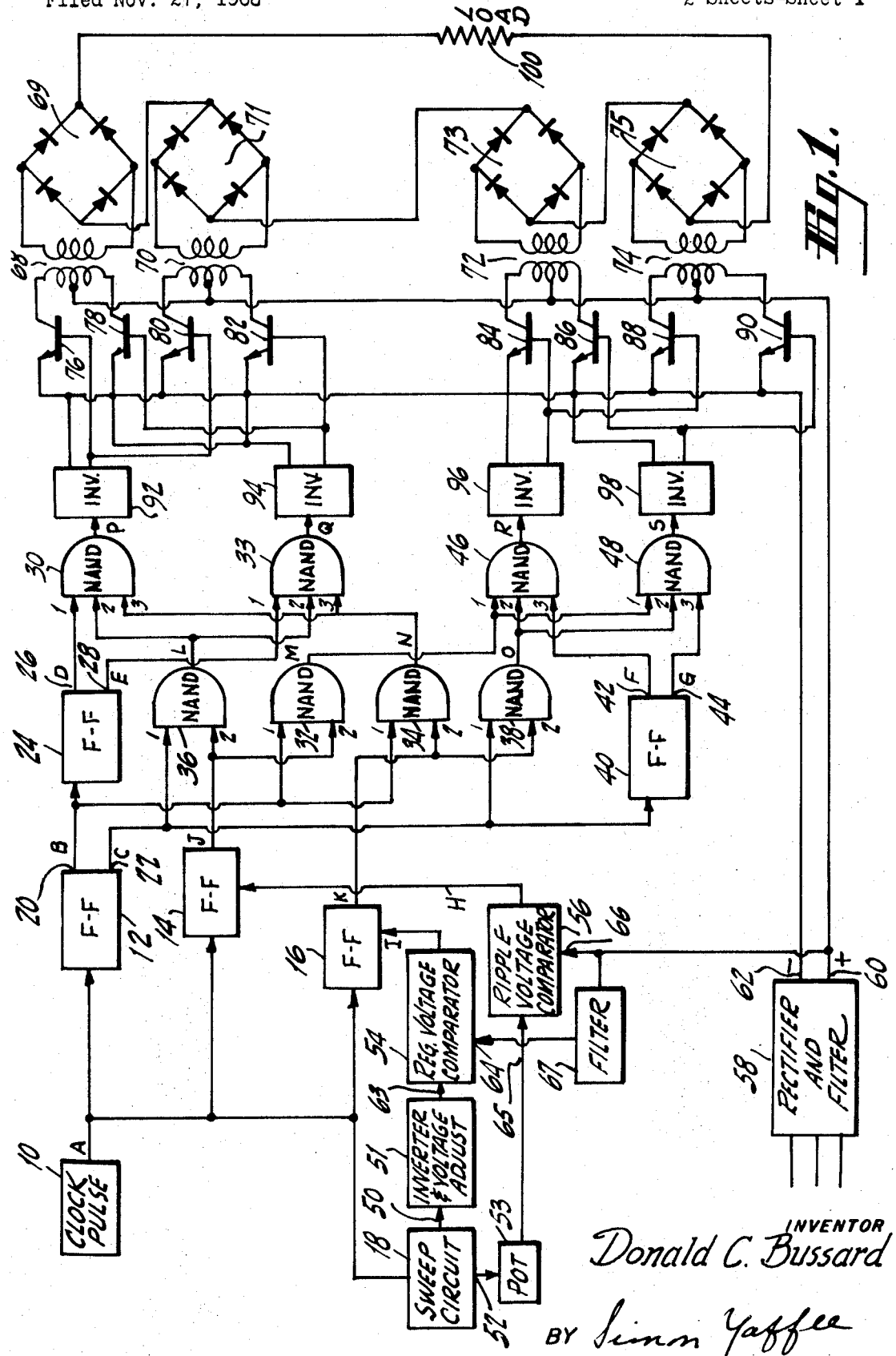

Switching power supplies in which a switching element connected in series between the power supply and the load is turned on or off in a manner to supply a constant voltage to the load are known. In such known power supplies, the load that can be supplied without overloading the power supply is fixed for each power supply, and if greater voltage or more current is required, a different power supply is required or several power supplies must be connected in series or in parallel. It is difficult to connect power supplies in series or in parallel and still so control the power supplies that they share the load properly. Furthermore, the control voltage for the power supply is usually that applied to the output load, whereby the control voltage may be quite high.

SUMMARY

In accordance with this invention, a control for power switching devices are provided. The control device varies the width of the current pulses that are passed by the switching device in accordance with a control voltage. One or more switching devices may be used. If more than one switching device is used, the output thereof may be connected in series or in parallel or in a combination of series and parallel to supply the voltage or current required by the load. However, since the control device can control more than one switching device, the control portion of the regulator is minimized in size. Various ones of the elements comprising the regulated power supply may be provided in the form of modules that are available commercially, whereby the cost of the completed power supply is minimized.

SHORT DESCRIPTION OF THE DRAWING

Figure 2:
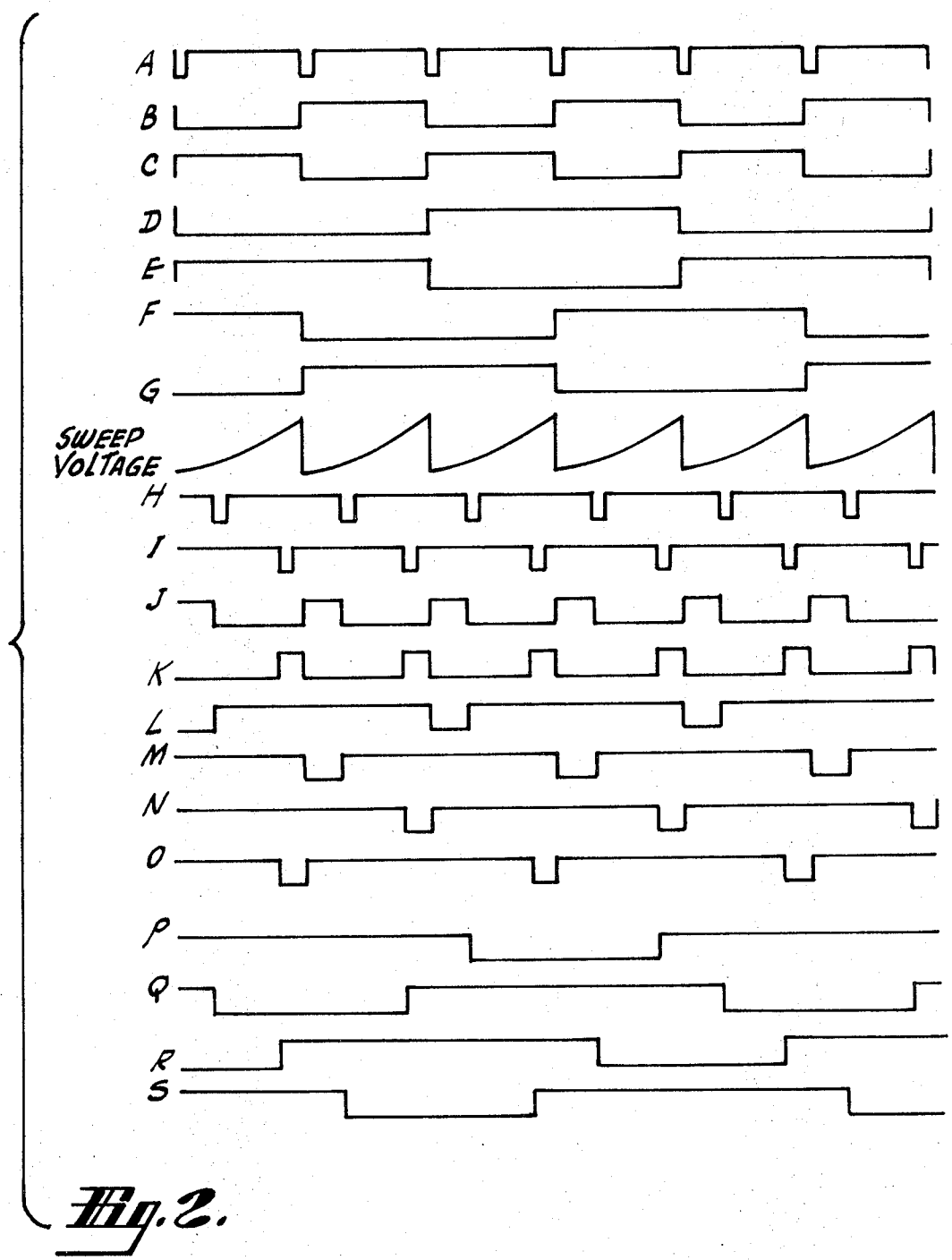

The invention will be be better understood upon reading the following description in connection with the accompanying drawing in which FIG. 1 is a circuit diagram partially in block form of a power supply embodying the invention, and FIG. 2 is a series of curves that are useful in explaining the operation of the power supply of FIG. 1.

DESCRIPTION

The output wave A, shown in FIG. 2, of a clock device 10 (FIG. 1) is applied to an input terminal of a first, second and third flip flop circuit (hereinafter F—F) 12, 14 and 16 respectively and to the input of a sweep circuit 18. The F–F 12 has two output terminals 20 and 22, the wave B (also FIG. 2) appearing at the terminal 20 and the wave C appearing at the terminal 22. The wave B is applied to the input terminal of a fourth F—F 24 having output terminals 26 and 28. A wave D appears at the terminal 26 and a wave E appears at the terminal 28. The wave D is applied to the 1 input terminal of a NAND circuit (hereinafter NAND) 30 having the three input terminals 1, 2 and 3. The wave E is applied to the 1 input terminal of a NAND 33, also having three input terminals 1, 2 and 3.

The terminal 20 of the F—F 12 is connected to the 1 input terminal of a NAND 32 having input terminals 1 and 2 and to 1 input terminal of a NAND 34, also having input terminals 1 and 2, whereby the wave B is applied to the 1 input of each of the NANDS 32 and 34. The terminal 22 of the F—F 12 is connected to the 1 input terminal of each of the NANDS 36 and 38, each of which has two input terminals 1 and 2, and to the input terminal of a F—F 40. The waves F and G appear at the output terminals 42 and 44 respectively of the F—F 40, and the terminals 42 and 44 are connected respectively to the 3 input terminals of NANDS 46 and 48, the NANDS 46 and 48 each having three input terminals 1, 2 and 3.

A voltage wave such as the curve labelled "sweep voltage" appears at each of the output terminals 50 and 52 of the sweep circuit 18. It will be noted that the sweep wave is concave when observed from the top, for a reason to be explained. The output terminals 50 and 52 of the sweep circuit 18 are connected respectively by way of an inverter and voltage adjusting device 51 to the input terminal of a regulating voltage comparator 54, and by way of a voltage adjusting device such as a potentiometer 53 to the input terminal of a ripple voltage comparator 56. A rectifier and filter 58, to which alternating power supply is applied, has a positive and a negative output terminal, 60 and 62 respectively. While 3 phase input is shown in the drawing for the rectifier 58, the number of phases used is unimportant. While, in the system shown, neither the terminal 60 or 62 is grounded, a four wire 3 phase system may be used in which the fourth wire (not shown) is grounded. In the system shown, the positive terminal 60 is connected to each of the second input terminals 64 and 66 respectively of the comparators 54 and 56. The connection to the terminal 66 is direct whereby ripple voltage that appears at the terminal 60 also appears at the input terminal 66. The terminal 60 is connected through a filter 67 to the terminal 64, where the average voltage appearing at the terminal 60 is applied to the terminal 64. If a grounded system is used, the connection of the terminal 60 to the terminal 64 or 66 need not be changed. However, if desired, instead of the connection shown, the connection to the terminals 64 and 66 may be from the load 100 that is applied to the described regulator. The outputs of the comparators 54 and 56 are connected to the second input terminals of the F—F's 16 and 14 respectively. The shape of the wave appearing at the output terminals of the comparators 54 and 56 are shown in FIG. 2 at I and H respectively. The output of the F—F 14, curve J, is applied to the 2 input terminals of the NANDS 32 and 36, and the output of the F—F 16, curve K, is connected to the two inputs of the NANDS 34 and 38. The output, wave L, of the NAND 36 is applied to the 2 input terminals of NANDS 30 and 33 and the output, curve M, of the NAND 32 is applied to the 1 input terminals of NANDS 46 and 48. The output, curve N, of the NAND 34 is applied to the 3 input terminals of the NANDS 30 and 33. The output, curve O, of the NAND 38 is connected to the 2 input terminals of the NANDS 46 and 48.

The positive terminal 60 of the rectifier 58 is connected to the center tap of a primary winding of each of a plurality of transformers 68, 70, 72 and 74, here shown as four in number. As will be pointed out, more or less transformers may be provided each having the center taps of the primary windings thereof connected to the terminal 60. The terminals of the primary winding of the transformer 68 are connected to the respective collectors of NPN transistors 76 and 78. The terminals of the primary winding of the transformer 70 are connected to the collectors of respective NPN transistors 80 and 82. The terminals of the primary winding of transformer 72 is connected to the collectors of respective NPN transistors 84 and 86. The terminals of the primary winding of the transformer 74 is connected to the respective collectors of the NPN transistors 88 and 90. The emitters of all the transistors 76, 78, 80, 82, 84, 86, 88 and 90 are connected to the terminal 62 of the rectifier 58. The bases of the transistors 76 and 80 are connected to an output terminal of an inverter 92. The emitters of the transistors 76 and 80 are connected to another output terminal of the inverter 92. The bases of the transistors 78 and 82 are connected to an output terminal of an inverter 94. The emitters of the transistors 78 and 82 are connected to another output terminal of the inverter 94. The bases of the transistors 84 and 88 are connected to an output terminal of the inverter 96. The emitters of the transistors 84 and 88 are connected to another output terminal of the inverter 96. The bases of the transistors 86 and 90 are connected to an output terminal of an inverter 98. The emitters of the transistors 86 and 90 are connected to another output terminal of the inverter 98. The output terminals of the NANDS 30, 33, 46 and 48, at which the respective waves P, Q, R and S appear, are connected to the input terminals of the inverters 92, 94, 96 and 98 respectively.

The secondary windings of each of the transformers 68, 70, 72 and 74 are connected across a pair of input terminals of respective rectifying bridges 69, 71, 73 and 75. The other or output terminals of the bridges 69, 71, 73 and 75 are connected in series with a load 100. If lower voltage and higher current is desired for the load 100, the outputs of all the bridges 69, 71, 73 and 75 may be connected in parallel, or if desired, a series parallel connection of the outputs of the bridges 69, 71, 73 and 75 may be used to provide intermediate current and voltage for the load 100.

In explaining the operation of the described circuit, it is noted that the clock pulse circuit 10 is a known oscillator that produces the negative going pulses as illustrated in curve A of FIG. 2, at constant intervals. All of the F—F's 12, 14, 16, 24 and 40 are identical and operate identically in that each time a pulse is applied to an input terminal thereof, the state of the output thereof changes as of the beginning of the applied pulse. Where there are 2 input terminals, see F—F's 14 and 16, application of a pulse to either input terminal reverses the phase of the output. Where there are two output terminals, see F—F's 12, 24 and 40, the voltages at an output terminal of each F—F is 180 degrees out of phase with the other thereof. The sweep circuit 18 produces an up going ramp voltage that starts at the end of the clamp pulse applied thereto. As noted in FIG. 2, the up going sweep voltage waves are concave when observed from the top for the purpose of keeping the power provided to the output transformers 68, 70, 72 and 74 substantially constant. The voltage comparators 54 and 56 produces a pulse when the voltages at their two input terminals are equal, and these comparators may each comprise a differential amplifier and a trigger circuit coupled to the output of the differential amplifier. Each of the NANDS 30, 32, 33, 34, 36, 38, 46 and 48 provides a high or positive output if any one (or more) of the input terminals thereof has a low or negative voltage applied thereto, and provides a low or negative output only when all the inputs thereto are high or positive. The inverter circuits 92, 94, 96 and 98 not only invert the voltages applied thereto but they may also act as drivers for the respective transistors to which they are coupled. Therefore, the transistors 76 and 80 are on or conductive only when the output of the NAND 30 is low or negative, and the transistors 76 and 80 are off or nonconductive at all other times. Similarly, the NAND 33 controls the conductivity of the transistors 78 and 82, and each of the other NANDS 46 and 48 control the conductivity of the transistors to which they are connected.

Clock pulses, curve A of FIG. 2, are applied to an input terminal of each of the F—F's 12, 14 and 16 and of the sweep circuit 18. At the beginning of each clock pulse, the phase of the two outputs from the F—F 12 reverses, that is, the terminal 20 of the F—F 12 becomes high or positive if it had been low or negative and the terminal 22 becomes low or negative if it had been high or positive, and vice versa, see curves B and C. The output terminal of the F—F 14, curve J, goes positive since it had been made negative by a previously applied input H pulse from the ripple voltage comparator 56, as will be explained. The output of the F—F 16 curve K, goes negative since it had been made positive by a previously applied input I pulse from the regulating voltage comparator 54. At the end of the clock pulse A, the sweep voltage 52 goes up or positive along a concave curve as shown. The output B of the F—F 20 is applied to an input of the F—F 24, whereby the out of phase waves D and E appears respectively at the output terminals 26 and 28 of the F—F 24, the waves D and E being at one half the frequency of the wave B. Similarly, since the wave C is applied to the input terminal of the F—F 40, out of phase waves F and G appear respectively at the output terminals 42 and 44 of the F—F 40 at one half the frequency of the wave C, the waves F and G being 90 degrees out of phase with the waves D and E.

The wave appearing at the independent output terminals 50 and 52 of the sweep circuit 18 are identical. The terminal 50 is connected to the inverter and voltage adjuster means 51. The output of the inverter and voltage adjuster 51 is connected to an input terminal 63 of the regulating comparator 64. Therefore, at the end of a clock pulse, curve A, an inverted sweep of adjustable size is applied to the input terminal 63 of the comparator 54. The terminal 52 of the sweep circuit 18 is connected to an input terminal 65 of the ripple voltage comparator 56 by way of the potentiometer 53, whereby a sweep voltage, such as that shown in FIG. 2 of adjustable size and 180 degrees out of phase with the sweep wave applied to the input terminal 63, is applied to the terminal 65. The filtered output voltage of the power rectifier 58, which is a measure of the voltage across the load 100, is applied to the other input terminal 64 of the regulating voltage comparator 54 by way of the filter 67. The voltage at the terminal 64 is therefore comparatively steady, varying only as the steady component of the voltage supplied by the rectifier 58 varies due to the line voltage change or due to load change. Since the sweep voltage which is applied to the input terminal 63 of the regulator 54 decreases from a maximum at the end of a clock pulse towards a minimum at the beginning of the next clock pulse (curve A), a time will come, between clock pulses A, when the voltage of the sweep wave will equal the voltage at the terminal 60. At that moment a pulse, curve I, will be applied by the regulator 54 to the F—F 16 to reverse the phase of the output thereof, see curve K. The wave K is applied to the 2 input terminals of the NANDS 34 and 38. Since the C wave is applied to the 1 input terminal of the NAND 38 and the B wave is applied to the 1 input terminal of the NAND 34, alternate K pulses appear as N pulses when the B wave is positive, and intervening K pulses appear as O pulses when the C wave is positive.

The peak of the ripple voltage appearing at the terminal 60 due to imperfect filtering by the rectifier and filter 60 is applied to the terminal 66 of the ripple voltage comparator 56, and when the sweep voltage applied to the other terminal 65 of the comparator 56 reaches the value of the peak of the ripple voltage, a pulse H is produced at the output of the comparator 56. The pulse H is applied to the second input terminal of the F—F 14 to reverse the phase of the output wave thereof to produce curve J. The wave J is supplied to the 2 input terminals of each of the NANDS 36 and 32. The wave C is applied to the 1 input terminal of the NAND 36 and the B wave is applied to the 1 input terminal of the NAND 32, whereby negatively going pulses L and M correspond respectively to alternative ones of J pulses and are coincident in time with J pulses. The L pulses are applied to the 2 input terminals of NANDS 30 and 33. Therefore, the waves D, L and N are applied to the 3 input terminals of the NAND 30.

For the purpose of simplifying the explanation of the operation of the disclosed regulator, it is pointed out at this point that only when the D wave, which is applied to the 1 input terminal of the NAND 30, is positive can the transistors 76 and 80 become conductive. Therefore, in the following explanation of how the transistors 76 and 80 become conductive and non-conductive it is assumed that the operation is taking place during a positive half cycle of the wave D.

When the sweep wave applied to the terminal 65 of the ripple comparator 56 arrives at the voltage of the ripple voltage applied to the terminal 66 of the comparator 56, a pulse H is produced at the output of the ripple voltage comparator 56. It will be noted that the higher the ripple voltage at the terminal 66, the more time elapses before the pulse H is produced. This pulse H (which is applied to the second input of the F—F 14 at a time after the A pulse has been applied to the first input terminal of the F—F 14), changes the J output from low to high. Therefore, the H pulse changes the output of the F—F 14 from high to low. Therefore the output L of the NAND 36 becomes high in that that part of the first half of the positive half cycle of the wave B during which the C wave is positive, and when the sweep voltage arrives at the voltage value of the peak voltage of the ripple wave applied to the terminal 66. The N wave is high whenever the B wave is low, as the B wave must be while the C wave is high. Since all three inputs to the NAND 30 are high, the output of the NAND 30 is low and the output of the inverter 92 is high and transistors 76 and 80 become conductive. Therefore, the transistors 76 and 80 become conductive only during the first half of the D wave under consideration and at a time when the sweep voltage reaches the amplitude of the ripple voltage. As noted above this time is later in the first half of the positive half cycle of the wave D the higher the value of the ripple voltage. Current flows from the terminal 60 through the center taps of the primary windings of the transformers 68 and 70 and through the collector to emitter path of transistors 76 and 80, and back to the terminal 62.

As pointed out, the beginning of the conductivity of the transistors 76 and 80 takes place during the first half of any positive half of a cycle of the wave D when the sweep voltage reaches the ripple voltage in magnitude. The conductivity of the transistors 76 and 80 is terminated during the second half of the same positive half cycle of the wave D as will now be explained.

The conductivity of the transistors 76 and 80 continues as long as the output of the NAND 30 is low, that is, as long as all three inputs of the NAND 30 are high. The 1 input of the NAND 30 remains high during the complete positive portion of the wave D. The wave L, which is applied to the 2 terminal of a NAND 30 remains high for the remainder of the first half of the positive portion of the D wave, since the J wave remains low until the next clock pulse A, which is coincident with the middle of the D half wave under consideration. At the moment that the J wave becomes high, the C wave becomes low, so the L wave remains high and the 2 input to the NAND 30 stays high during the second half of the D half cycle under consideration. The N wave which is applied to the 3 input of the NAND 30 depends on the B wave and on the K wave. The B wave is high throughout the second half of the positive portion of the D wave. Therefore, the K wave will be considered.

The clock pulse A causes the K wave to become low at the middle of the positive portion of the D wave, so, as long as the K wave is low, the N wave and therefore the 3 input of the NAND 30 is high. Since all three inputs to the NAND 30 remain high, the transistors 76 and 80 stay on.

An inverted sweep wave is applied to the terminal 63 of the regulating comparator 54. As the sweep voltage goes down, a time will come when the sweep voltage is equal to the line voltage applied to the terminal 64. At that moment, the I pulse is produced changing the K wave from low to high. Since both of the inputs to the NAND 34 are high, the N wave becomes low and the output of the NAND 30 becomes high and the transistors 76 and 78 cease to conduct. The lower the line voltage applied to the terminal 64, the longer it takes the inverted sweep, applied to the terminal 63, to arrive at the line voltage applied to the terminal 64. Therefore, the lower the line voltage, the longer the transistor 76 and 80 are conductive during the second half of the positive portion of the wave D.

It will be noted that the onset of the conductivity of the transistors 76 and 80 depends on the peak of the ripple voltage at terminal 66 of the comparator 56, and that the onset of the nonconductivity of the transistors 76 and 80 depends on the line voltage applied to the terminal 64 of the comparator 54. Due to this operation of the described regulator, the onset of the conduction of the transistors 76 and 80 may be controlled as by adjustment of the potentiometer 53 connected between the terminal 52 and the terminal 65 to reduce ripple voltages, and the cessation of conductivity of the transistors 76 and 80 may be adjusted as by adjustment of the voltage adjuster included in the inverter 51 which is connected between the sweep terminal 50 and the regulation comparator terminal 64, to maintain constant the voltage output of the regulator applied to the load 100. Since each adjustment is independent of the other, better individual adjustments of the ripple and of the load voltage is possible in the described regulator.

It will be noted that during the negative halves of the wave D, the transistors 76 and 80 cannot become conductive, since the 1 input of the NAND 30 is negative whereby the wave P must be positive. The NAND 33 is provided to cause the transistors 78 and 82 to become conductive under control of the ripple voltage comparator 76 and to become non-conductive under control of the regulating voltage comparator 54 during the negative half cycles of the wave D, whereby more continuous use is made of the rectified voltage appearing between the terminals 60 and 62 of the rectifier 58. Since the operation of the NAND 33 and the circuits connected thereto is like the operation of the NAND 30 and its circuits, no further explanation of operation of the NAND 33 appears necessary except to note that when the 1 terminal of the NAND 30 is negative the 1 terminal of the NAND 33 is positive.

During operation of the regulator, using only the NANDS 30 and 33, there may be periods when no one of the transistors 76, 78 and 80 or 82 is conductive. The NANDS 46 and 48 and their connections are provided to make still more continuous use of the voltage appearing across the rectifier terminals 60 and 62. It will be noted that the waves F and G appearing at the output terminals 42 and 44 respectively of the F—F 40, are 90 degrees out of phase with the waves D and E. Therefore, the transistors 84 and 88, which are controlled by the NAND 46 can become conductive only during a period that is 90 degrees out of phase with the transistors 76 and 80 which are controlled by the NAND 30, and the transistors 86 and 90, which are controlled by the NAND 48, can become conductive only during a period that is 90 degrees out of phase with the transistors 78 and 80 which are controlled by the NAND 33. Thereby, the voltage provided by the rectifier 58 is always being used while the described regulator is on. Due to the similarity of the connections of the NANDS 46 and 48 to the NANDS 30 and 33, no further explanation of the operation of the NANDS 46 and 48 appears necessary.

Four center tapped transformers 68, 70, 72 and 74 are provided, the conduction through the primary winding of each half of which is controlled by a respective transistor. If desired, the transformers 70, 72 and 74 or any one or more thereof may be omitted if the load 100 to be supplied permits. Or, more transformers and respective current controlling transistors may be supplied for control by the P, Q, R and S waves, with the use of the inverters 92, 94, 96 and 98 as shown, or with the addition of individual inverters, to supply a load requiring more current or more voltage. The secondary windings of the one or more transformers that are used may be connected to individual rectifiers (as shown) and the output of the rectifiers may be connected in series or in parallel or in series parallel as required to supply the applied load. It is therefore seen that a very flexible regulated power supply has been described in which the elements up to and including the NANDS 30, 33, 46 and 48 can supply a great many different loads for very different current and voltage requirements by merely changing the number of, and if necessary, the connection of the elements including and beyond the inverters 92, 94, 96 and 98. Furthermore, if both the rectifier 58 and the circuit including the load 100 is grounded, the regulating voltage which is applied to the terminal 64 of the comparator 54 and the ripple voltage which is applied to the terminal 66 of the comparator 56 may be taken from the supply rectifier (as shown) or may be taken from the load circuit, whichever is more advantageous. Furthermore, many of the parts of the described regulator, such as the F—F's and the NANDS are commercially available modules, whereby the cost of building a power supply is reduced.

What is claimed is:

1. A voltage regulator for providing a regulated D.C. voltage level to a load, comprising:
   means for providing a periodic reference signal;
   means for providing a sensing voltage related to the voltage to be regulated, said sensing voltage having a ripple component and a D.C. component;
   a first comparator responsive to said periodic reference signal and to said sensing voltage for providing a first control signal;
   a second comparator responsive to said periodic reference signal and to only the D.C. component of the sensing voltage for providing a second control signal;
   pulse generating means responsive to said first and second control signals for generating a chain of pulses, the location of one edge of each pulse in said chain being determined by said first control signal and the location of the other edge of each pulse in said chain being determined by said second control signal, whereby the pulse width of each pulse in said chain is varied in accordance with the ripple component and, independently, in accordance with the D.C. component of said sensing voltage; and
   rectifying means responsive to said chain of pulses for providing said regulated D.C. voltage level.

2. The voltage regulator according to claim 1, wherein said means for providing a periodic reference signal further comprises:
   a sweep generator for providing a periodic sweep signal wave;
   an inverter circuit responsive to said periodic sweep wave for providing an inverted sweep signal corresponding to said periodic sweep wave;
   means coupled to said inverter circuit for varying the peak amplitude of said inverted sweep signal and for providing said inverted signal to said first comparator; and
   means coupled to said sweep generator for varying the peak amplitude of said periodic sweep wave and for providing said periodic sweep wave to said second comparator.

3. The voltage regulator according to claim 2, wherein:
   said first comparator provides said first control signal at times corresponding to the time when the amplitude of said inverted periodic sweep wave provided at said first comparator equals the amplitude of said sensing voltage; and
   said second comparator provides said second control signal at times corresponding to the time when the amplitude of said periodic sweep wave provided at said second comparator equals the amplitude of said D.C. component.

4. The voltage regulator according to claim 3 wherein said pulse generating means includes:
   at least one pair of transistors, the base of each transistor being connected to a first terminal and the emitter of each transistor being conected to a second terminal; and
   at least one pair of transformers each having a primary and a secondary winding, the collector of one transistor being connected to one terminal of the primary winding of the first transformer and the collector of the other transistor being connected to one terminal of the primary winding of the second transformer, the secondary winding of each transformer being connected to said rectifying means.

5. A voltage regulator for providing from a source of A.C. power, a regulated D.C. voltage level to a load, comprising:
   means coupled to said A.C. source for rectifying and filtering said A.C. power and for providing a primary D.C. signal, said primary signal having a D.C. level with a ripple component;
   means for providing a sample of said regulated D.C. voltage;
   means for generating a periodic reference signal;
   a first comparator responsive to said primary D.C. signal and to said periodic reference signal for providing a first control signal;
   a second comparator responsive to said regulated voltage sample and to said periodic signal for providing second control signal;
   pulse generating means responsive to said control signals for generating a chain of pulses, the location of one edge of each pulse in said chain being determined by said first control signal and the location of the other edge of each pulse in said chain being determined by said second control signal, whereby the pulse width of each pulse in said chain is adjusted in accordance with variations in the primary D.C. signal and independently adjusted in accordance with variations in the regulated voltage; and rectifying means responsive to said chain of pulses for providing said regulated D.C. voltage level.

References Cited

UNITED STATES PATENTS

| | | | |
|---|---|---|---|
| 2,875,397 | 2/1959 | Parks | 321—27X |
| 3,184,615 | 5/1965 | Stover | 307—265X |
| 3,233,116 | 2/1966 | Watrous | 307—265X |
| 3,325,716 | 6/1967 | Gomi | 321—2 |

OTHER REFERENCES

Electronics, "Power Supply Uses Switching Preregulation," Mar. 9, 1962.

IBM Technical Disclosure Bulletin, "DC to DC Converter," vol. 6, No. 10, p. 30, March 1964.

WILLIAM H. BEHA, JR., Primary Examiner

U.S. Cl. X.R.

307—265; 321—18, 27